July 4, 1967 — J. J. DI VIETRI — 3,329,442
PORTABLE LOAD CARRIER FOR LUGGAGE AND THE LIKE
Filed Oct. 22, 1965 — 2 Sheets-Sheet 1

INVENTOR
JOHN J. DI VIETRI
BY
Edward F. Levy
ATTORNEY.

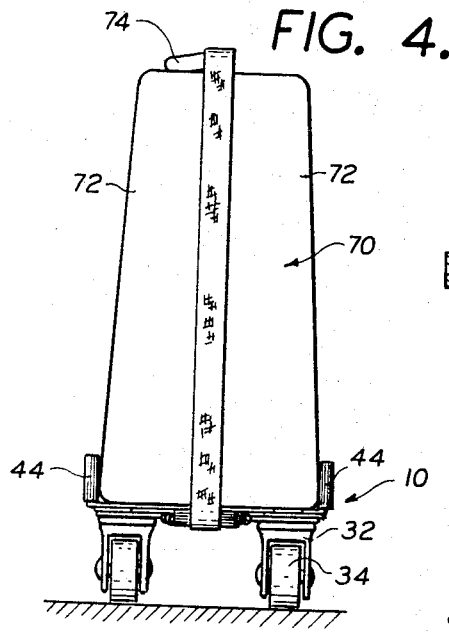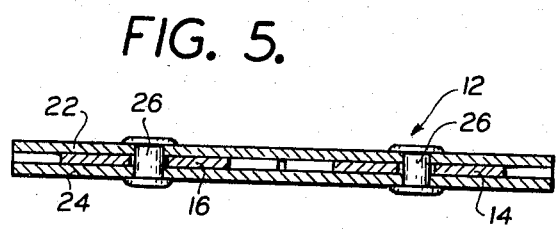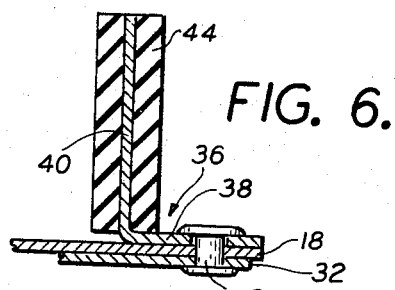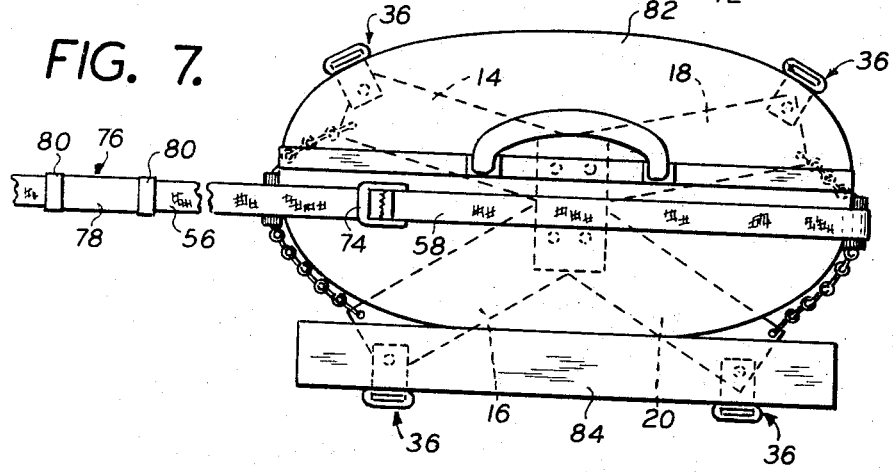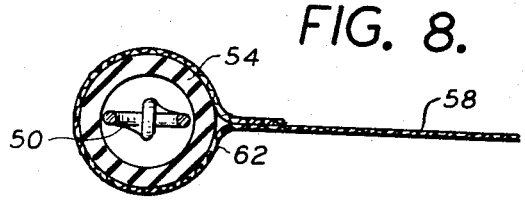

United States Patent Office 3,329,442
Patented July 4, 1967

3,329,442
PORTABLE LOAD CARRIER FOR LUGGAGE
AND THE LIKE
John J. Di Vietri, 652 88th St., Brooklyn, N.Y. 11228
Filed Oct. 22, 1965, Ser. No. 501,186
9 Claims. (Cl. 280—35)

The present invention relates to improvements in portable load carriers to be employed in transporting heavy articles such as luggage.

Portable dollies or other wheeled devices have been found practical for use in transporting heavy objects along a ground surface. In recent years, such devices have become increasingly popular for the transport of heavy suitcases in and to railroad stations, air terminals and the like, when porters are not readily available. These devices normally are in the form of a small flat platform mounted upon rollers or wheeled casters, the article of luggage being set upon the platform and held in place by a strap or belt. Such conventional transporting devices are subject to several disadvantages. The mounting belts or straps are not sufficient to maintain the luggage firmly on the platform, so that the article of luggage tends to become detached and may fall. In addition, the platform is usually not adapted to support and carry more than one article, and when a series of belts are employed for securing more than one article or an irregularly-shaped article, use of the belts becomes complicated and is inconvenient. Further, since the wheels are fixed upon the platform body, they are often located undesirably close together when large articles are transported so that the mounted article tends to topple over.

It is an object of the present invention to provide an improved load transporting device having an expansible support platform capable of supporting loads of various sizes.

Another object of the invention is to provide a load transporting device of the type described, having two pairs of wheels so mounted on the expansible support platform that the wheels are spaced apart a maximum distance and are located at the sides of the article to be transported, to provide a wide wheel base regardless of the size of said article.

Another object of the invention is the provision of a load supporting device of the character described in which a plurality of load-clamping members are mounted on the support platform and a strap or belt is employed for attaching the load to the platform, the belt being operatively associated with the clamping members in such a manner that the members are brought into firm clamping engagement with the load when the belt is tightened about said load. The device is therefore extremely simple to use in mounting the load, the tightening of a single belt about the load also automatically causing the clamping members to grip the load at its bottom end, resulting in rigid and efficient mounting of the load.

A further object of the invention is to provide a load transporting device of the type described in which the expansible platform and clamping members carried thereby are flexible in use and are capable of mounting and supporting articles of luggage or other objects of various shapes and sizes, and are further capable of simultaneously mounting a number of different articles.

A further object of the invention is the provision of a load transporting device of the type described which can be folded up into a small and compact unit when not in use, and which is made of few parts so that it is economical in manufacture.

In accordance with the invention there is provided a load transporting device having a flexible, self-adjusting support platform comprising a central base member, and a pair of support arms pivotally mounted at each side of said base member. The base member and each support arm has a flat upper surface adapted to support a load, such as an article or articles of luggage resting thereon. Each support arm has a wheeled caster rotatably mounted at the outer end thereof and depending therefrom, and a retaining bracket mounted at its outer end and upstanding therefrom. The outer ends of each pair of support arms are connected together by a flexible member which may be in the form of a length of chain, and a strap or belt section is conected to each of said flexible members. Each pair of arm members is adapted to be spread apart to locate the retaining brackets outside the edge of a load resting on said arms, and said belt sections are adapted to be drawn tightly and fastened about the body of said load, whereby the belt sections are pulled in opposite directions away from said platform to bring the arm sections toward each other and the retaining brackets into gripping engagement with said load. The retaining brackets are pivotally mounted on the support arms for conforming to loads of various shapes to be supported.

Additional objects and advantages of the invention will become apparent during the course of the following specification where taken in connection with the accompanying drawings, in which:

FIG. 4 is an end elevational view of the device in the position of FIG. 1, supporting an article of luggage;

FIG. 5 is an enlarged section taken along line 5—5 of FIG. 3;

FIG. 6 is an enlarged section taken along line 6—6 of FIG. 3;

FIG. 7 is a top plan view showing the load supporting device mounting a plurality of articles of different shapes; and FIG. 8 is an enlarged section taken along line 8—8 of FIG. 2.

Figure 2:
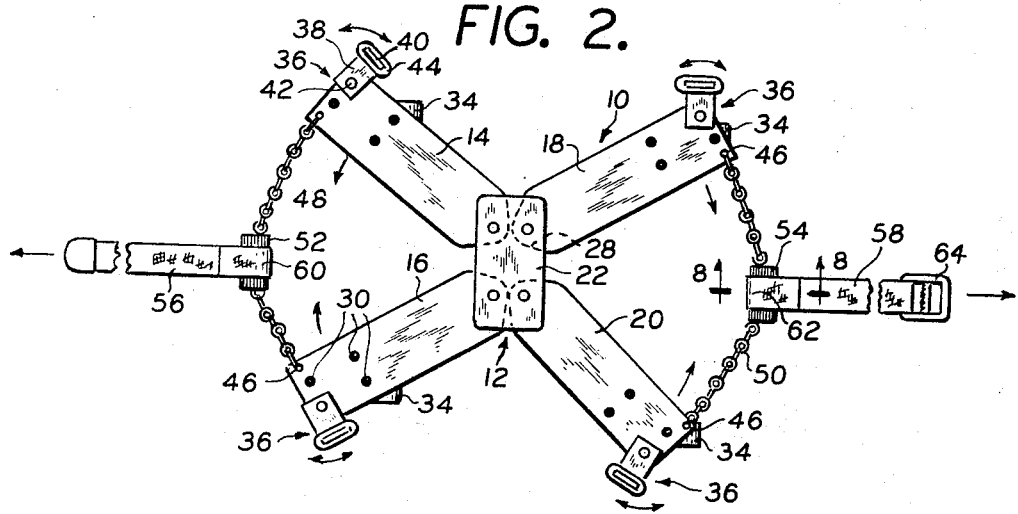
FIG. 2 is a top plan view of the load transporting device shown in an extended position for receiving a load.
Figure 3:
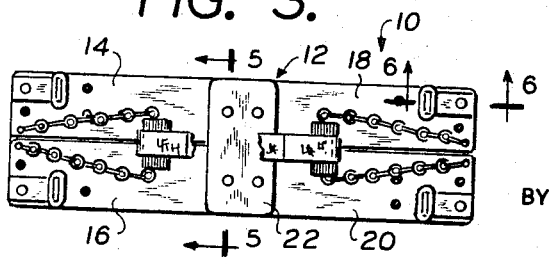
FIG. 3 is a top plan view similar to FIG. 2, but showing the load transporting device in retracted position.

Referring in detail to the drawings, and in particular to FIGS. 2 and 3 thereof, there is shown a load transporting device 10 made in accordance with the present invention and generally comprising a central base member 12 upon which four roller-supporting arm members 14, 16, 18 and 20 are pivotally mounted.

The central base member 12 is formed of two metal plates 22 and 24 of identical shape, which is preferably rectangular, and disposed in spaced parallel relationship and in registry with each other. The ends of arm members 14, 16, 18 and 20 extend between the plates 22 and 24 and are pivotally mounted thereon by respective rivets 26 which extend through appropriate apertures in the plates 22 and 24 and corresponding registering apertures in the end portions of said arm members, as shown in FIG. 5.

The arm members 14, 16, 18 and 20 are in the form of elonagted metal plates, and are of identical size and shape, each being substantially rectangular except for its inner, mounted end which is of the rounded and tapered shape shown at 28 in FIG. 2. These tapered ends 28 permit the arm members 14–20 to pivot independently upon the base member 12 without interfering with each other. The base plates 22 and 24 are spaced apart by the ends of the arm members 14–20 and are secured together by rivets 26 which also serve as the pivotal mounts for said arm members.

Mounted adjacent the outer end of each of the arm members 14–20 on the bottom surface thereof, as by rivets 30, is a ball bearing swivel caster 32 of conventional type having a wheel 34. Also mounted on the outer end of each arm member is an L-shaped retaining bracket 36. As shown in FIG. 6, each retaining bracket has a horizontal base arm 38 terminating in an integral upstanding arm 40. The base arm 38 of each bracket 36 overlies the upper surface of a respective arm member 14–20 and is pivotally mounted on the outer corner thereof by a rivet 42. Each of the brackets 36 is thus independently rotatable upon its respective arm member, as indicated by the arrows in FIG. 2. The upstanding arms 40 of the brackets 36 are covered by a rubber sleeve 44.

Each arm member 14, 16, 18 and 20 has at its outer end an aperture 46 located at the corner of the respective arm member opposite to the corner upon which the bracket 36 is mounted. The apertures 46 of the adjacent pair of arm members 14 and 16 are connected by a length of chain 48, while the apertures 46 of the pair of adjacent arm members 18 and 20 at the other side of the base 12 are connected by a similar length of chain 50.

A small rubber tube 52 is loosely mounted on chain 48 and a similar rubber tube 54 is mounted on chain 50 in the same manner. The looped end 60 of a belt section 56 embraces the rubber tube 52, while the rubber tube 54 is similarly embraced by the looped end 62 of a belt section 58. The belt section 58 carries a conventional toothed buckle 64.

FIG. 3 shows the transporting device 10 in a retracted position for storage. In this position, the arm members 14 and 16 are brought parallel to each other at one side of the device with their inner longitudinal edges in flush abutment. At the other side of the device, the arm members 18 and 20 are similarly brought into parallel, flush abutment. It will be noted that the length of the central base member 12 is equal to the combined widths of the two adjacent arm members 14, 16 or 18, 20, and in the folded condition of FIG. 3, the device therefore presents a compact rectangular form with continuous, unbroken edges. In this storage condition, the four retaining brackets 36 are turned so that the axes of the horizontal arms 38 are parallel to the longitudinal axis of the device 10, and the brackets 36 overlie the top surface of the respective arm members 14–20 without protruding therefrom. The caster wheels 34 are also aligned with the axis of said device. The belt sections 56 and 58 may be wrapped tightly about the device to retain it in this compact, collapsed form, in which it may be conveniently stored, or may be carried in the piece of luggage to be later transported.

Figure 1:
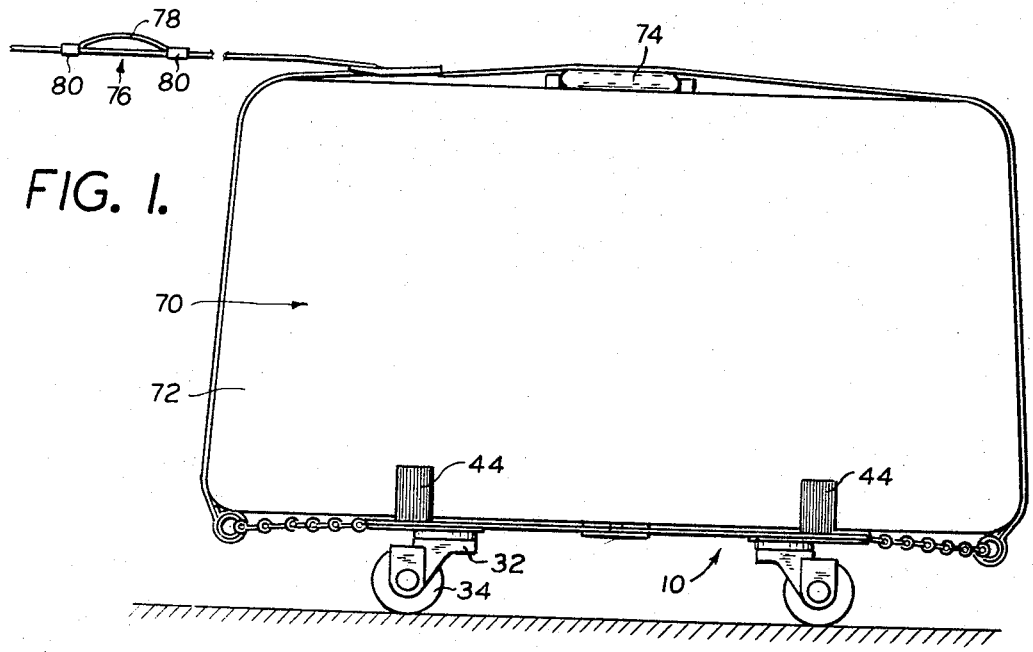
FIG. 1 is a side elevational view showing the load transporting device of the present invention mounting an article of luggage.

FIGS. 1 and 4 show the device 10 mounted upon a suitcase 70 for purposes of transporting the latter. The particular suitcase 70, shown for purposes of illustration, has inclined side walls 72, and the usual handle 74. To mount the device 10, the device is placed on the ground surface, the arm members 14–20 are pivoted angularly outwardly, as shown in FIG. 2, and the bracket members 36 are turned until they extend outwardly from their respective arm members.

The suitcase 70 is then placed upon the extended transporting device 10 with its center resting upon the base member 12, and the belt sections 56 and 58 are brought upwardly around the ends of the suitcase 70, toward each other in the manner shown in FIG. 1. The end of belt section 56 is passed through the toothed buckle 64 carried by the opposite belt section 58, and the belt is tightened about the suitcase 70 to mount it firmly upon the transporting device 10.

It will be appreciated that when the belt sections 56 and 58 are drawn tightly about the suitcase 70, they pull the centers of the respective chains 48 and 50 in opposite directions away from the central base member 12. The pulling force on the center of chain 56 causes said chain to pull the extended pair of arm members 14 and 16 inwardly toward each other. In a similar manner, the pulling force on chain 50 draws the extended pair of arm members 18 and 20 inwardly toward each other. The brackets 36 are thereby brought into engagement with the side walls 72 of the suitcase 70, as shown in FIG. 4, said brackets 36 automatically turning about their respective pivots 42 until their upstanding arms 40 are aligned with the planes of said side walls 72. The rubber sleeves 44 covering said upstanding arms 40 press firmly against and tightly grip the lower end portions of the side walls 72, this gripping pressure increasing as the belt is drawn tighter about the body of the suitcase 70. It will therefore be apparent that the single act of tightening the belt sections 56 and 58 about the suitcase 70 not only clamps the suitcase downwardly upon the upper surface of the transporting device 10, but also automatically causes the lower end of the suitcase to be tightly gripped between the brackets 36.

The rubber sleeves 44 on brackets 36 not only aid in the gripping effect of the brackets 36 by providing greater friction against the side walls 72, but also prevent marring or scuffing of the surface of the suitcase. Similarly, the rubber tubes 52 and 54 prevent the chains 48 and 50 from abrading the suitcase surface when the belt sections are tightened, by maintaining the chains spaced from said surface.

In FIG. 1, the suitcase 70 is shown mounted in normal upstanding position upon the device 10 with its bottom wall resting upon said device. In this position, the suitcase handle 74 is uppermost and is available to be grasped by the user and employed to roll the luggage along upon the wheeled device 10 to its destination. Where the mounted luggage is not high, this may be inconvenient in causing the user to stoop to grasp the handle 74. In such a situation, the suitcase may be turned to an endwise position so that its end wall rests upon the device 10, and its height is therefore increased. The handle 74 would therefore be located at the side of the mounted suitcase and would be unavailable for grasping. To eliminate this difficulty, a separate handle 76 may be provided. This handle 76 may be in the form shown in FIG. 1 constituting a strap 78 having loops 80 formed at its outer ends and slidably receiving one of the belt sections 56 or 58. When the belt sections are tightened about the endwise-mounted suitcase, the handle 76 is slid to the center of the top surface of the suitcase, and the user may grasp the strap 78 to roll along the mounted suitcase.

The flexibility of the transporting device 10 in securely mounting luggage or other articles of varying sizes and shapes, is illustrated in FIG. 7, in which two different articles are shown mounted on said device. There is shown a tapered suitcase 82 and a rectangular case 84 both mounted in side-by-side relationship on the device 10. It will be observed that the arm members 14 and 18 are extended outwardly at a different angle from the arm members 16 and 20 to accommodate to the irregular shape of the load. Further, the brackets 36 on the arm members 14 and 18 have turned thereon to conform to the tapered side edge to the straight edge of the rectangular case 84. Although the belt sections 56 and 58 overlie only the suitcase 82, the case 84 is firmly mounted by virtue of the action of the brackets 36 which press case 84 tightly against suitcase 82.

It is to be understood that in addition to use in transporting articles of luggage, the device of the instant invention may be employed in carrying other heavy loads, such as cartons, crates and the like. The arm members are adapted to be spread apart sufficiently to support load bases of widely diversified shapes and sizes and the bracket members thereon are self-adjusting to grip these loads efficiently. An important feature of the invention resides in the fact that since the casters are mounted on the outer ends of the arm members, their wheels are automatically positioned at the outer ends of the load so as to be spaced apart a maximum distance for supporting the weight of the load.

While a preferred embodiment of the invention has been shown and described herein, it is obvious that numerous omissions, changes and additions may be made in such embodiment without departing from the spirit and scope of the invention.

What I claim is:

1. A load transporting device comprising a load supporting platform and a pair of strap sections for attaching a load upon said platform, said platform comprising a central base member, a pair of support arms pivotally mounted at their inner ends to one side of said base member, a second pair of support arms pivotally mounted at their inner ends to the opposite side of said base member, and a flexible member connecting the outer ends of each pair of arms, each of said arms having a depending wheeled caster mounted at its outer end, and a retaining bracket pivotally mounted at its outer end and upstanding therefrom, said strap sections being respectively connected to said flexible members for drawing the same outwardly in opposite directions away from said platform when the straps are drawn tightly about a load resting on said platform.

2. A load transporting device comprising an adjustable load supporting platform and a pair of strap sections for attaching a load upon said platform, said platform comprising a flat central base member, a first pair of flat support arms pivotally mounted at their inner ends to one side of said base member, a second pair of flat support arms pivotally mounted at their inner ends to the opposite side of said base member, and a flexible member connecting the outer ends of each pair of arms, each of said arms having a depending wheeled caster rotatably mounted at its outer end, and a retaining bracket pivotally mounted at its outer end and upstanding therefrom, said strap sections being respectively connected to the center portions of each of said flexible members for drawing the same outwardly in opposite directions away from said platform when the straps are drawn tightly about a load resting on said platform.

3. A load transporting device comprising an adjustable load supporting platform and a pair of strap sections for attaching a load upon said platform, said platform comprising a central base member, a first pair of support arms pivotally mounted at their inner ends to one side of said base member, a second pair of support arms pivotally mounted at their inner ends to the opposite side of said base member, and a flexible member connecting the outer ends of each pair of arms, each of said arms having a wheeled caster mounted at its outer end and depending therefrom, and a retaining bracket mounted at its outer end and upstanding therefrom, said support arms having a retracted position in which they are parallel to each other and are aligned with the longitudinal axis of said device, and an extended position in which they project angularly from said base member, said base member and support arms having flat top surfaces for supporting a load thereon with the arms in extended position, said strap sections being connected to said flexible member for drawing the same outwardly in opposite directions away from said platform when the straps are drawn tightly about a load resting on said platform, whereby to draw the support arms of each pair toward each other and the retaining brackets into gripping engagement with the load resting on said platform.

4. A load supporting device according to claim 3 in which each of said retaining brackets is pivotally mounted on a respective support arm, said retaining brackets being self-adjusting and turning on said support arms to make flush engagement with the surface of the load resting on said platform regardless of the shape of said load.

5. A load supporting device according to claim 4 in which each of said brackets comprises a base arm parallel to and overlying the upper surface of its respective support arm and pivotally connected thereto, and an integral arm perpendicular to said base arm and upstanding from said support arm.

6. A load supporting device according to claim 3 in which each of said belt sections terminates in a loop slidably mounted upon one of said flexible members.

7. A load supporting device according to claim 3 in which said flexible members comprise lengths of chain.

8. A load transporting device according to claim 3 in which said base is rectangular and said arms are rectangular and elongated, with their axes normal to the axis of said base in said retracted positions, the length of said base being substantially equal to the combined widths of each of said pair of support arms whereby the edge of said platform is substantially continuous and unbroken.

9. A load transporting device according to claim 8 in which said wheeled casters are mounted at the outer corners of said support arms opposite the adjacent support arm in each pair.

References Cited

UNITED STATES PATENTS

| | | | |
|---|---|---|---|
| 525,298 | 8/1894 | Thiele et al. | 280—35 |
| 2,534,367 | 12/1950 | Perrotta et al. | 280—35 |
| 2,629,607 | 2/1953 | Roubeck | 280—35 |

BENJAMIN HERSH, *Primary Examiner.*

L. D. MORRIS, *Assistant Examiner.*